United States Patent
Lounsbury

(10) Patent No.: US 6,476,572 B2
(45) Date of Patent: Nov. 5, 2002

(54) POWER SUPPLY SYSTEM AND METHOD FOR DOCK EQUIPMENT

(75) Inventor: Mark S. Lounsbury, Wassaic, NY (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/825,722

(22) Filed: Apr. 3, 2001

(65) Prior Publication Data
US 2002/0140390 A1 Oct. 3, 2002

(51) Int. Cl.[7] .................................................. H02P 5/00
(52) U.S. Cl. ............................. 318/139; 318/3; 318/9; 182/662; 14/69.5; 14/71.1; 14/71.3; 414/401; 414/584
(58) Field of Search ........................ 318/139, 3, 9, 318/587; 320/109, 111, DIG. 34; 187/222; 182/66.2; 105/90.2; 14/69.5, 71.1, 71.3; 414/401, 584

(56) References Cited

U.S. PATENT DOCUMENTS

| | | | | |
|---|---|---|---|---|
| 5,323,098 A | * | 6/1994 | Hamaguchi et al. | 320/2 |
| 5,345,163 A | * | 9/1994 | Gibbons et al. | 320/48 |
| 5,348,437 A | * | 9/1994 | Krupke et al. | 414/401 |
| 5,638,387 A | * | 6/1997 | Palleggi et al. | 318/67 |
| 5,646,507 A | * | 7/1997 | Timmons et al. | 320/21 |
| 5,803,215 A | * | 9/1998 | Henze et al. | 191/2 |
| 6,123,162 A | * | 9/2000 | Rodriguez et al. | 180/8.3 |
| 6,163,913 A | * | 12/2000 | DiSieno et al. | 14/71.3 |
| 6,346,792 B1 | * | 2/2002 | Summerfield et al. | 320/109 |
| 6,198,251 B1 | * | 3/2002 | Landon | 320/124 |

* cited by examiner

Primary Examiner—Robert E. Nappi
Assistant Examiner—Rina I. Duda
(74) Attorney, Agent, or Firm—Gardere Wynne Sewell LLP

(57) ABSTRACT

An electric power supply system for dock equipment at a freight loading dock, such equipment including dock levelers and truck restraints which are powered by electric motors. The emergency power supply system utilizes electric powered freight moving vehicles, such as lift trucks, which include on-board storage battery electric power sources. The dock equipment includes controllers which are provided with selector switches for selecting power from an electrical distribution system or from the lift trucks by way of a disconnectable power cable assembly. An AC voltage step-down transformer and rectifier are provided for supplying the proper voltage to the controller, depending on the voltage and current characteristics required of the dock equipment motor or motors.

13 Claims, 3 Drawing Sheets

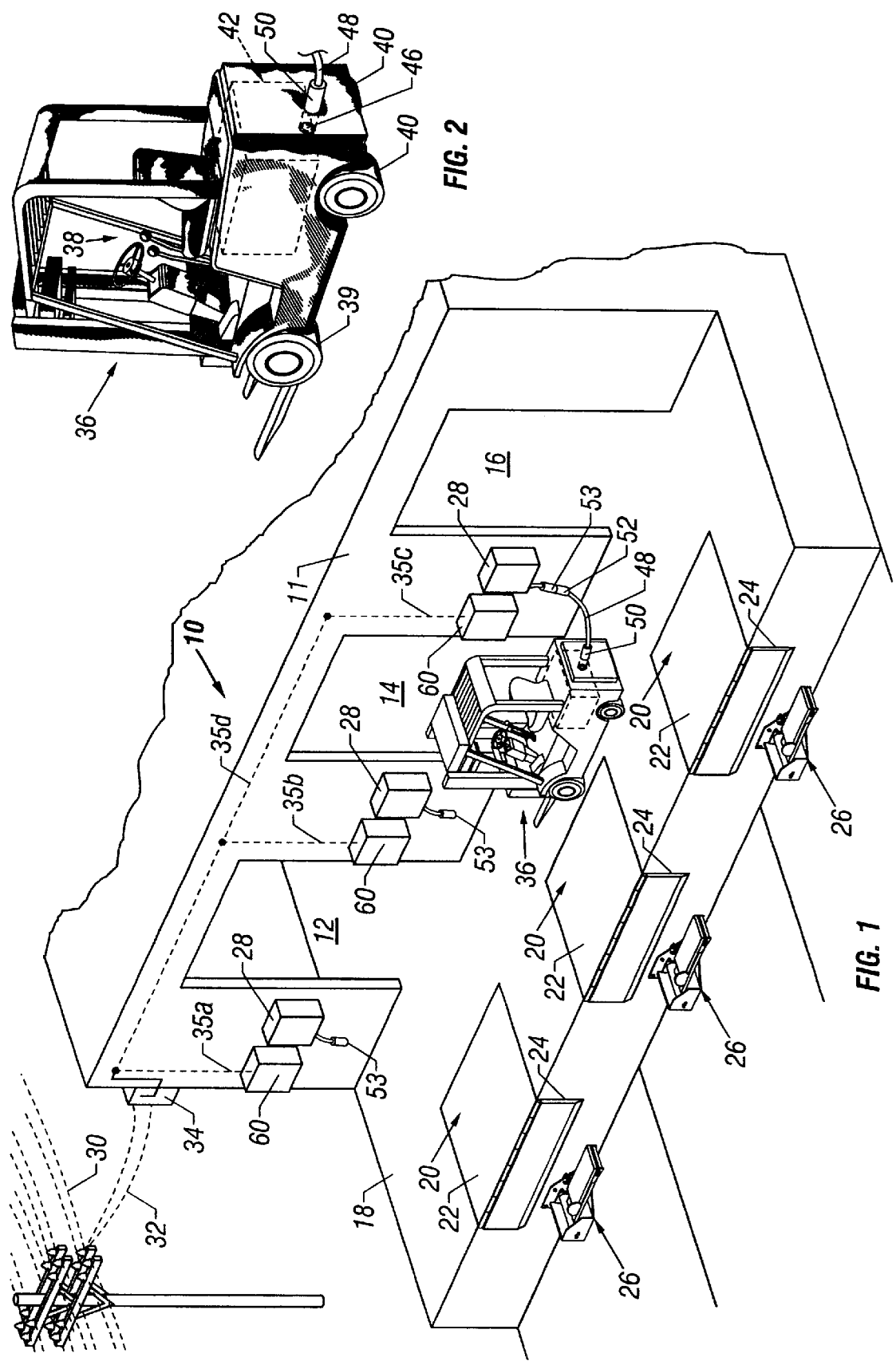

POWER SUPPLY SYSTEM AND METHOD FOR DOCK EQUIPMENT

FIELD OF THE INVENTION

The present invention pertains to an emergency power supply system and method for operating freight loading dock equipment, such as dock levelers and truck restraint devices, utilizing electrical power from electric lift trucks and the like.

BACKGROUND

Freight loading docks for motor trucks employ a substantial amount of electric powered equipment, including dock levelers or dockboards and truck restraints, for example. In freight loading docks for large warehouses, production facilities and freight carrier freighthouses, a substantial number of electric powered dock levelers and truck restraints may be operated on a substantially around the clock basis. Certain types dock levelers use electric motor powered hydraulic operating mechanisms. Examples of such dock levelers are commercially available from the assignee of the present invention through its W.B. McGuire Company. For example, W.B. McGuire MKA series and AUTODOK series dock levelers use electric motor powered hydraulic pumps to raise and lower the dock leveler ramps. Certain types of dock levelers are all electric powered, such as the type disclosed and claimed in U.S. Pat. No. 6,163,913, also assigned to the assignee of the present invention. Still further, freight loading docks may utilize electric motor powered truck restraints associated with each dock station.

The above-mentioned dock equipment is normally wired for use of electric utility supplied power via conventional power distribution networks and through conventional voltage stepdown transformers to supply power at relatively low AC voltages, for example. This reliance on utility supplied power can, of course, create certain problems in operating large freight loading docks which are in use in around the clock warehouse operations and freight carrier freighthouses, as well as large commercial production manufacturing and distribution facilities. In this regard it has been deemed highly desirable and often necessary to consider providing an emergency power supply in the event of loss of utility supplied electrical power.

Freight loading docks also, in most instances, utilize several electric motor powered hand and rider type freight moving vehicles for use in loading and unloading larger over the road freight hauling trucks, such freight moving vehicles including those commonly known as forklift trucks. Electric motor powered rider and hand operated type lift trucks typically carry an onboard power supply, such as a storage battery bank, providing relatively low voltage direct current (DC) power, such as twelve volt DC to fortyeight volt DC power, for example. Since such lift trucks can serve as a source of electric power, it would be advantageous to utilize them for providing emergency power to operate dock equipment, such as dock levelers, dockboards and truck restraints. It is to these ends that the present invention has been developed.

SUMMARY OF THE INVENTION

The present invention provides an emergency power supply system and method for operating freight loading dock equipment, such as electric motor powered dock levelers, dockboards and truck restraints, for example.

In accordance with one aspect of the present invention an emergency power supply system is provided for operating a dock leveler using a lift truck as a power supply source, such as a battery bank onboard the lift truck. The emergency power supply system includes a power cable for connecting the onboard battery bank of the lift truck to a controller for a dock leveler, for example. A flexible power cable assembly may be interconnected between the lift truck and a control circuit included in the dock equipment controller. The controller includes circuitry which is operable to be switched from using utility supplied power to using power from a lift truck battery bank. The controller includes a connector plug for connecting the flexible power cable assembly to the controller, a selector switch for selecting the power source to be from the utility supplied power or the lift truck supplied power, as the case may require. Still further, the controller may utilize a transformer and rectifier for converting high voltage utility supplied alternating current (AC) power to the proper direct current (DC) voltage required of the dock equipment motor and which is compatible with the voltage of the lift truck battery bank.

In accordance with another aspect of the invention a method is provided for operating freight loading dock equipment on an emergency basis which includes the steps of providing a controller for the dock equipment which is operably connected to the dock equipment electric motor, the controller including a selector switch and, when a loss of utility supplied power is incurred, an electric powered freight moving vehicle or lift truck is parked in the vicinity of the controller, a quick connect/disconnect electric cable assembly is interconnected between the lift truck onboard battery bank and the controller and the selector switch on the controller is positioned to provide for supply of electric power to the dock equipment from the lift truck. The dock equipment may then be operated on an emergency basis to move between an operating position and a stored or so-called cross traffic position, in the case of a dock leveler, and to move a truck restraint between a working position and a stored position, as needed. In this way freight loading docks may utilize an alternate or emergency power source which is convenient, readily available under virtually all operating circumstances, and may be used on an emergency basis to operate dock equipment to provide for loading, unloading and moving freight vehicles with respect to the dock facility at the which the dock equipment is disposed.

Those skilled in the art will further appreciate the above described advantages and superior features of the invention, together with other important aspects thereof upon reading the detailed description which follows in conjunction with the drawings.

BRIEF DESCRIPTION OF THE DRAWINGS

FIG. 1 is a perspective view of a freight loading dock, including multiple dock levelers and truck restraints for multiple dock stations, and showing, in somewhat generalized form, an emergency power supply system for operating such dock equipment;

FIG. 2 is a perspective view of a battery powered electric motor driven lift truck which may be used in conjunction with the power supply system and method of the invention;

DETAILED DESCRIPTION OF PREFERRED EMBODIMENTS

Figure 3:
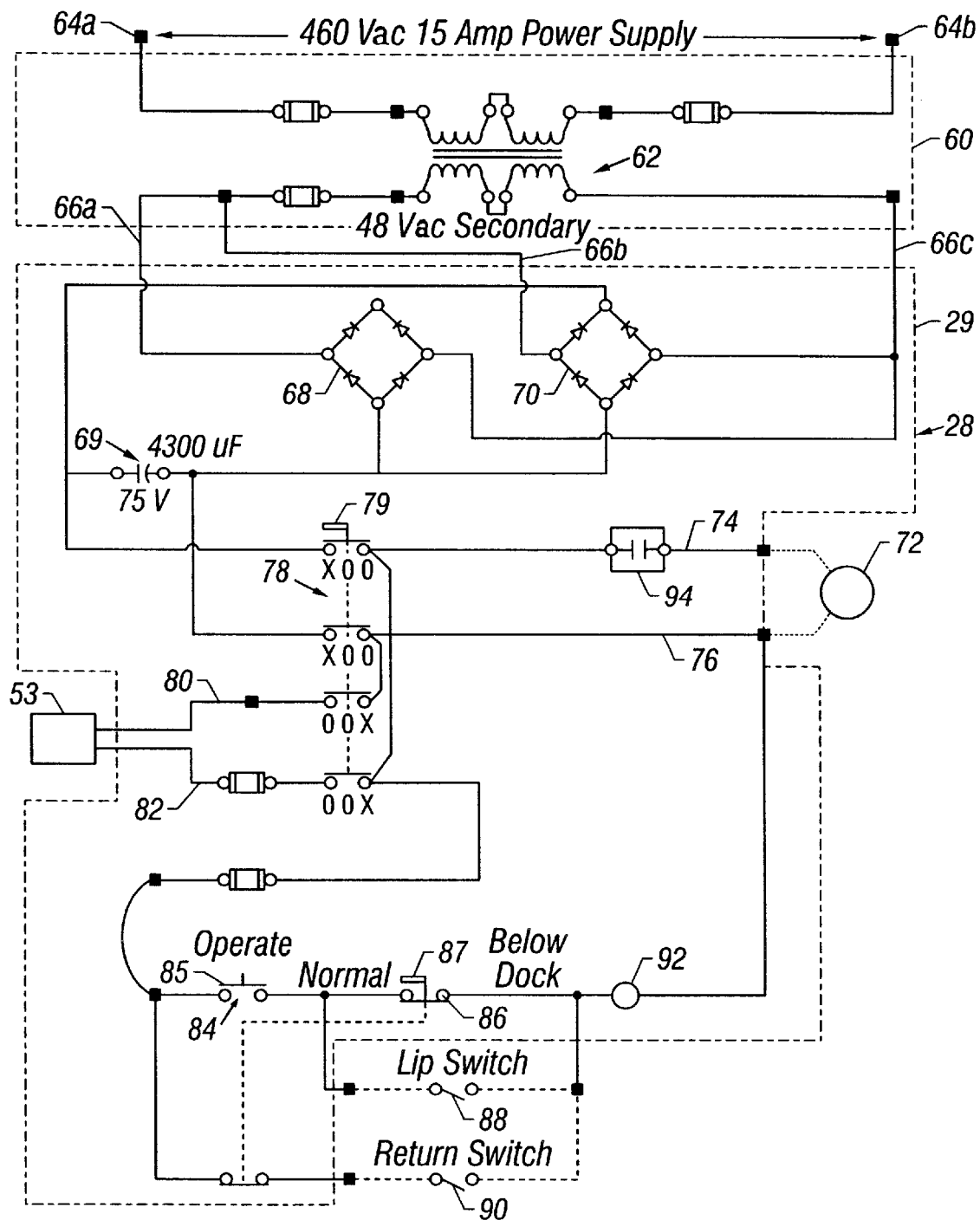
FIG. 3 is a schematic diagram of a controller for the dock equipment shown in FIG. 2.

In the description which follows like parts are marked throughout the specification and drawing with the same reference numerals, respectively. The drawing figures are not necessarily to scale and certain features may be shown in generalized or schematic form in the interest of clarity and conciseness.

Referring to FIG. 1, there is illustrated a portion of a freighthouse, generally designated by the numeral 10, including multiple freight loading and unloading dock stations 12, 14 and 16, each of which includes portions of a generally horizontal platform or dock surface 18. Each of freight loading and unloading stations 12, 14, and 16 includes an electric motor powered dock leveler 20. Each dock leveler 20 includes an elevatable ramp 22, shown in the so-called cross traffic position substantially coplanar with dock surface 18 in the illustration of FIG. 1. Dock leveler ramps 22 each include a pivotable extension lip 24 on the distal end thereof. The dock levelers 20 may be of a type as mentioned hereinbefore and commercially available from the W.B. McGuire Company, Hudson, N.Y., a division of the assignee of the present invention. The dock levelers 20 may also be of the type described in U.S. Pat. No. 6,163,913 issued Dec. 26, 2000 to DiSieno, et al., which is incorporated herein by reference. Each of the dock stations 12, 14, and 16 may also include a motor driven truck restraint, generally designated by the numeral 26. The truck restraints 26 may be of a type generally as described in U.S. Pat. No. 5,348,437 issued Sep. 20, 1994, also assigned to the assignee of the present invention, and the subject matter of which is also incorporated herein by reference. The truck restraints 26 may also be of the type described in U.S. patent application Ser. No. 09/614,352, filed on Jul. 12, 2000 and also assigned to the assignee of the present invention. Each of the dock levelers 20 and truck restraints 26 are operable to be moved between working and stored positions by electric motors, respectively. By way of example, each of the dock levelers 20 may be operated by a controller, generally designated by the numeral 28. The controllers 28 are adapted to be mounted in a position for easy access by dock operating personnel for operating the dock levelers 20. The controllers 28 are shown mounted spaced apart on wall 11 of freighthouse 10 at the respective dock stations 12, 14 and 16. Each of the controllers 28 is adapted to be connected to a source of electric power, such as a conventional electric utility transmission system, 30. Transmission system 30 includes suitable conductors 32 for transferring power at a suitable alternating current (AC) voltage to a junction box or local distribution circuit 34 at freighthouse 10 for distribution to each of the controllers 28. For example, power may be supplied to the controllers 28 at 460 volts AC, although other voltages may be utilized.

Referring briefly to FIG. 2, the freighthouse 10 is preferably provided with one or more electric motor powered freight moving vehicles, such as a so-called forklift truck 36. Forklift truck 36 may be of a type commercially available and sold under the brandnames Caterpillar, Clark or Hyster, for example. The exemplary truck 36 shown includes a sitdown type rider control station 38. Freight moving lift truck 36 is supported on spaced apart wheels 39 and 40. The electric motor driven lift truck 36 includes an onboard power source comprising a battery bank 42 which may include multiple interconnected rechargeable storage batteries of conventional construction. Battery bank 42 is operable to supply power to truck propulsion motor(s) and other onboard operating equipment, not shown, at a suitable voltage, such as forty-eight volt DC power, for example. The battery bank 42 is adapted to be connected to a source of battery recharging power, not shown, via a connector 46 which is mounted on the lift truck 36 and may be suitably electrically connected across the power terminals of the battery bank 42 in a conventional manner.

In accordance with the present invention, and in the event of a failure of electric power to be supplied from the utility distribution system 30 to the controllers 28, each of the controllers 28 may be selectively electrically connected to the battery bank 42 of the lift truck 36, or other electrically powered freight moving dock situated trucks or the like, not shown, via a flexible power cable assembly 48, see FIGS. 1 and 2. Power cable assembly 48 includes suitable quick connect/disconnect connector members 50 and 52 at opposite ends thereof for electrically connecting the controller 28 to the battery bank 42, see FIG. 4 also, via the connector member 46 on lift truck 36 and a connector member 53 on controller 28. By way of example only, connector members 50, 52 and 53, at least, may be of a type such as type SB connectors available from Anderson Power Products, Sterling, Mass.

Accordingly, in the event of a power interruption from the utility distribution system 30, the motorized freight moving vehicle or lift truck 36 may be used to operate any one of the dock levelers 20 and/or truck restraints 26, at will, by connecting the onboard power source of the vehicle, such as the battery bank 42 to a controller 28 utilizing a flexible power cable assembly 48. Each of the dock levelers 20 may be operated, as needed, and the freight moving vehicle or lift truck 36 may be moved from one dock station to the other to operate the dock equipment associated therewith, respectively. Of course, if multiple electric motor powered freight moving vehicles, such as the lift truck 36, are being utilized at the freighthouse 10, any one of such vehicles may be moved into a position in proximity to a controller 28 to provide emergency power to the dock equipment of the freighthouse by way of one or more cable assemblies 48 connected to the respective controllers.

Figure 4:
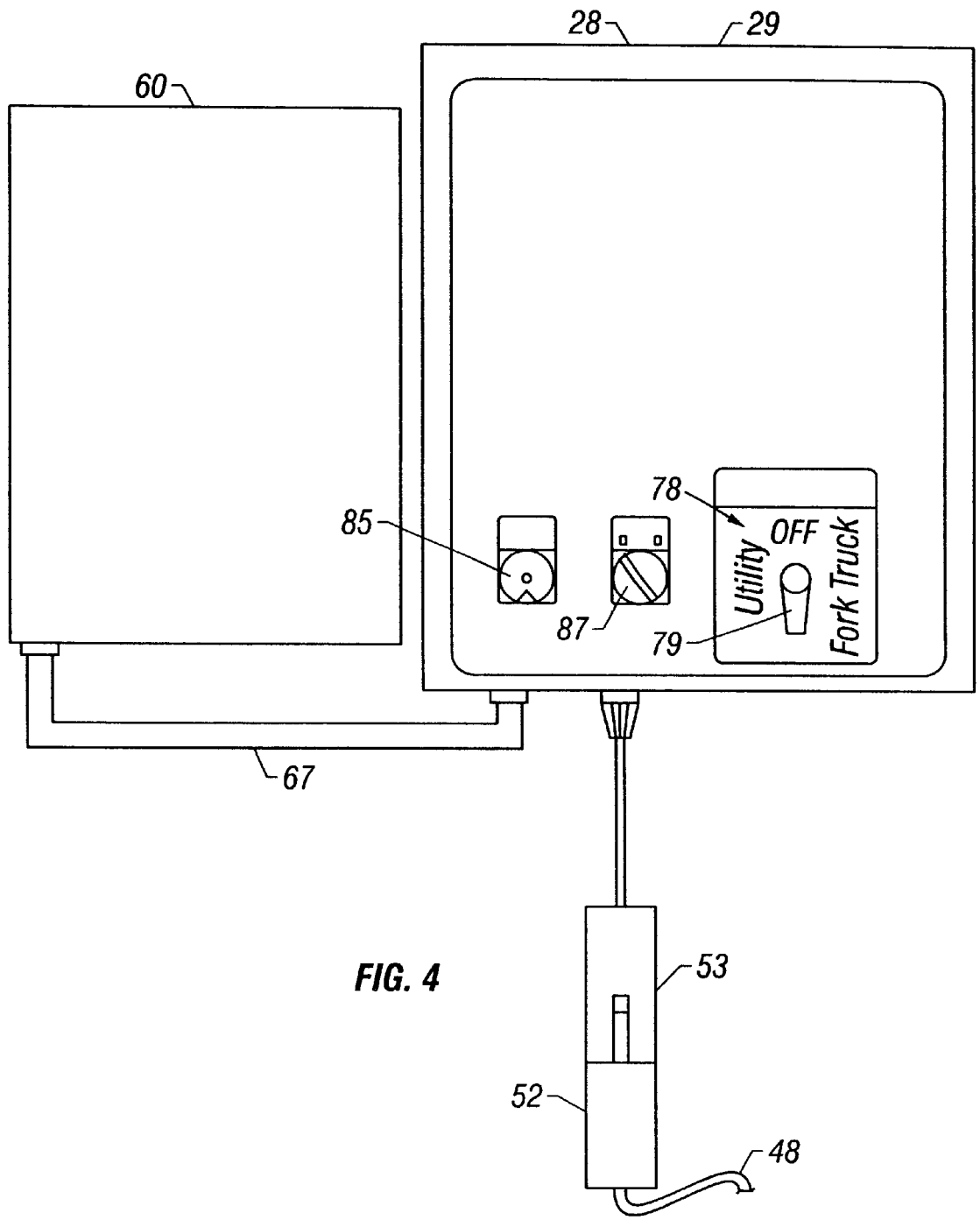
FIG. 4 is a front elevation of an enclosure for the controller shown schematically in FIG. 3.

Referring now to FIGS. 3 and 4, FIG. 3 shows a schematic diagram of the major components of a controller 28 which are disposed within a housing or enclosure 29. In situations where the AC electrical power from the distribution system 30 is at a voltage higher than the voltage of operation of the lift truck 36 and/or the dock equipment 20 or 26, a suitable transformer is provided within an enclosure 60, FIGS. 1, 3 and 4. As shown in FIG. 3, a conventional stepdown transformer 62 is disposed in enclosure 60 and is operable to be connected to the distribution system 30 by way of suitable conductor means 32, junction circuit 34, conductor means 35a, 35b, 35c and 35d, FIG. 1, and conductors 64a and 64b, FIG. 3, respectively. Suitable inline fuses or circuit breakers are utilized throughout the circuit of controller 28, as shown in FIG. 3. Conductors 66a, 66b and 66c are interconnected between the low voltage taps of transformer 62 and circuitry within the enclosure 29, which includes a power converter device comprising bridge rectifiers 68 and 70 and capacitor 69, as shown in FIG. 3. Conductors 66a, 66b and 66c are preferably disposed in a suitable conduit 67, FIG. 4. Accordingly, stepped down AC voltage is supplied to the controller 28, as needed by the requirements by the dock leveler drive motor, shown in FIG. 3 and designated by the numeral 72. The motor 72 may be connected to a hydraulic pump, not shown, for a hydraulically powered dock leveler, or to suitable operating mechanism for a dock leveler such as described and claimed in U.S. Pat. No. 6,163,913. Alternatively, motor 72 may be associated with a truck restraint 26. For example, dock leveler motor 72 is indicated to be a forty-eight volt DC motor which is adapted to be operably connected to the bridge rectifier 68 and 70 by way of conductors 74 and 76. 193 Conductors 74 and 76 are connected to a rotary selector switch 78 of a type commercially available whereby forty-eight volt DC electric power may be obtained from the distribution system 30 by way of transformer 62 and rectifiers 68 and 70, or forty-eight volt DC electric power may be received from an electric motor driven freight moving vehicle, such as the lift truck 36, by way of conductors 80 and 82. Accordingly, connector 53, operable to be mechanically and electrically connected to the connector 52, see FIGS. 3 and 4, is suitably connected via conductor 80 and 82 across the terminals of the switch 78, as illustrated in FIG. 3, to provide electrical power to the motor 72 via the conductors 74 and 76 when the connector 53 is connected to the alternate or emergency power source comprising the battery bank 42 via the power cable assembly 48. Selector switch 78 includes a suitable selector lever 79, FIGS. 3 and 4, disposed on the exterior of the enclosure 29 for moving the switch between positions for connecting the controller 28 and motor 72 to the distribution system 30, or to the battery bank 42, or neither power source.

As further shown in FIG. 3, the controller 28 includes an "operate" switch 84 and a "below dock or normal" mode selector switch 86 connected to certain switches 88 and 90 which are associated with dock leveler ramp 22 and extension lip 24 to control operation of the dock leveler 20 in the so-called below dock positions. Switch 84 includes a suitable push button actuator 85, see FIGS. 3 and 4, disposed on the exterior of the enclosure 29 and selector switch 86 also includes a selector lever 87 also disposed on the exterior of the enclosure 29. A power relay 92, 94, FIG. 3, is operable to control operation of the motor 72 via the switches 84 and 86.

Accordingly, each controller 28 may be selectively operated to receive power from an electrical distribution system 30, such as might be supplied by an electric utility, or another power source. However, each controller 28 is also operable to receive power for operating dock equipment, such as a dock leveler 20, from an emergency source comprising lift truck 36 or other electrically powered freight moving vehicle associated with operation of the freighthouse 10 and which may be moved into close proximity to one of the controllers, as indicated in FIG. 1, and connected thereto via a power cable assembly 48.

In accordance with a preferred method of operation of the emergency power supply system of the invention, in the event of failure of power from the distribution system 30, switch 78 for the controller 28 of a dock leveler to be operated is moved to its "off" position. An electric motor powered freight moving vehicle, such as a lift truck 36, including an onboard DC power source, may be moved into proximity to controller 28 and electrically connected thereto via a flexible power cable assembly 48. The battery bank 42 is operably connected to the controller 28 by way of the power cable assembly 48 by connecting the battery bank to cable connector 50 via the plug 46 and connecting the power cable assembly 48 to the controller 28 via the connector plug members 52 and 53. The selector switch 78 may then be moved from the off position to the position entitled "fork truck", see FIG. 4, to provide a power source for operating the motor 72 by operation of switches 84 and 86, as required.

In order to avoid unwanted depletion of power from the battery bank 42, any dock equipment to be operated thereby, such as the dock levelers 20, would normally be operated only to restore the dock levelers to a cross traffic position or to a position to allow movement of an over the road freight vehicle, not shown, to or from one of the dock stations 12, 14 or 16. However, in an emergency situation where operations are required to continue at least on a short term basis, one or more of the freight moving vehicles, such as the lift truck 36, may be used to power the dock equipment, as needed.

The emergency power source, such as the lift truck 36, may remain electrically connected to a controller 28 by way of a cable assembly 48 until power is restored from the distribution system 30. If only one or a very limited number of freight moving vehicles, such as the lift truck 36, are available, the lift truck 36 may be moved from one dock station to another and connected to the associated controller 28 of the dock station requiring operation of its dock leveler 20 or truck restraint 26. The selector switch 78 is preferably moved to its off position to conserve power and avoid use of the dock leveler 20 except by authorized personnel, as needed. Moreover, the controller 28 may be adapted to be used to at least partially recharge the battery bank 42 of the emergency power source once electrical power is restored from the distribution system 30, if desired. Accordingly, the emergency power supply system of the present invention may be used to supply power from the freight moving vehicles of a dock system or to supply power to the freight moving vehicles, if the distribution system 30 is operable.

Those skilled in the art will recognize that the particular operating voltages of the controller 28, the power distribution system 30, and the motor 72 may be selectively varied. Moreover, the motor 72, for example, may be an AC electric motor and the controller 28 may include a power converter device comprising an inverter for converting DC power from a battery bank onboard a lift truck or similar freight moving vehicle, to alternating current (AC) power for operating the dock leveler motor. Still further, the system and method of the invention may be adapted to operate the truck restraints 26 as described above.

The construction and operation of the emergency power supply system and a method of operation have been described in some detail herein. Those skilled in the art will further appreciate that various substitutions and modifications may be made to the system and method of the invention without departing from the scope and spirit of the appended claims.

What is claimed is:

1. A power supply system for a freight loading dock for operating dock equipment comprising at least one of a dock leveler and a vehicle restraint, said dock equipment including an electric motor operable for moving said dock equipment between a working position and a stored position, said power supply system comprising:

a controller operable to receive electrical power from an electrical power distribution system and to supply electrical power to said motor;

at least one electric powered freight moving vehicle operable at said loading dock for moving freight thereon;

conductor means for electrically connecting said controller to said electric powered freight moving vehicle to supply electrical power to said motor; and said controller includes switch means operable for providing electrical power to said motor from one of said distribution system and said electric powered freight moving vehicle.

2. The power supply system set forth in claim 1 wherein:

said switch means includes a manually actuated selector switch for selecting electrical power to be connected to said motor from one of said distribution system and said electric powered freight moving vehicle, at will.

3. The power supply system set forth in claim 2 wherein:
said selector switch is operable to be in a position for connecting said motor to said electric powered freight moving vehicle as a power source, a position for receiving electrical power from said distribution system as a power source and a position for disconnecting said motor from either power source.

4. The power supply system set forth in claim 3 wherein:
said controller includes rectifier means adapted for connection to said distribution system to convert AC power from said distribution system to DC power for operating said motor.

5. The power supply system set forth in claim 2 wherein:
said conductor means includes a flexible cable assembly including connectors at each end thereof for connecting said controller to a battery bank on said electric powered freight moving vehicle and to said controller, at will.

6. The power supply system set forth in claim 1 including:
a transformer adapted to be connected to said distribution system and to said controller for converting AC power delivered by said distribution system to an AC voltage corresponding to a DC voltage supplied by said electric powered freight moving vehicle.

7. An emergency power supply system for a freight loading dock for operating dock equipment comprising at least one of a dock leveler and a vehicle restraint, said dock equipment including an electric motor operable for moving said dock equipment between a working position and a stored position, said power supply system comprising:
  at least one electric powered freight moving vehicle operable at said loading dock for moving freight thereon;
  a controller operable to receive electrical power from an electrical power distribution system and to supply electrical power to said motor;
  a flexible cable assembly for electrically connecting said controller to said electric powered freight moving vehicle to supply electrical power to said motor in the event of loss of power from said distribution system; and
  said controller including a selector switch for selecting electrical power to be connected to said motor from one of said distribution system and said electric powered freight moving vehicle, at will, and a power converter operably connected to said distribution system for converting one of DC and AC electrical power to the other of AC and DC electrical power for operating said motor.

8. The power supply system set forth in claim 7 wherein:
said selector switch is operable to be in a position for connecting said motor to said electric powered freight moving vehicle as a power source, a position for connecting said motor to said distribution system as a power source and a position for disconnecting said motor from either power source.

9. The power supply system set forth in claim 7 including:
a transformer adapted to be connected to said distribution system and to said controller for converting AC power delivered by said distribution system to an AC voltage corresponding to a DC voltage supplied by said electric powered freight moving vehicle.

10. A method for operating a dock leveler at a freight loading dock, wherein said dock leveler includes a ramp movable between a working position and a stored position at said loading dock, an electric motor operable for moving said ramp between said positions and a controller for operating said motor, said controller being operably connected to an electric power distribution system, said method comprising the steps of:
  operating said motor of said dock leveler in the event of loss of electric power from said distribution system by:
  providing an electric powered freight moving vehicle including an on-board electric power source;
  providing a power cable assembly for connecting said on-board electric power source to said controller;
  connecting said on-board electric power source to said controller; and
  operating said dock leveler by way of said controller using said on-board electric power source.

11. The method set forth in claim 10 including the step of:
providing a selector switch on said controller for selectively connecting said motor to said distribution system and said on-board electric power source; and
moving said selector switch to a position to receive power from said on-board electrical power source.

12. The method set forth in claim 10 including the step of:
providing said motor to operate at the voltage and current characteristic of said on-board electric power source.

13. The method set forth in claim 12 including the step of:
providing one of a transformer and rectifier for converting power from said distribution system to the voltage and current characteristics of said motor and said on-board electric power source.

* * * * *